United States Patent
Peng

(12) 
(10) Patent No.: US 8,490,938 B2
(45) Date of Patent: Jul. 23, 2013

(54) IN-CEILING, IN-WALL ONE BUTTON INSTALLER

(75) Inventor: Jack Peng, Taoyuan (TW)

(73) Assignee: Meiloon Industrial Co., Ltd., Taoyuan (TW)

( * ) Notice: Subject to any disclaimer, the term of this patent is extended or adjusted under 35 U.S.C. 154(b) by 213 days.

(21) Appl. No.: 12/947,728

(22) Filed: Nov. 16, 2010

(65) Prior Publication Data

US 2012/0119042 A1  May 17, 2012

(51) Int. Cl.
*B42F 13/00* (2006.01)

(52) U.S. Cl.
USPC ........ 248/343; 248/231.9; 248/342; 181/150; 381/386

(58) Field of Classification Search
USPC .......... 248/318, 320, 342, 343, 344; 181/150; 381/87, 385, 386, 388
See application file for complete search history.

(56) References Cited

U.S. PATENT DOCUMENTS

| | | | |
|---|---|---|---|
| 4,546,850 A * | 10/1985 | Litner | 181/141 |
| 4,673,149 A * | 6/1987 | Grote et al. | 248/343 |
| 6,588,543 B1 * | 7/2003 | Tchilinguirian | 181/150 |
| 7,587,059 B2 * | 9/2009 | Wright | 381/387 |
| 7,676,045 B2 * | 3/2010 | Merrey et al. | 381/87 |
| 8,023,664 B2 | 9/2011 | Yang | |
| 2007/0121988 A1 * | 5/2007 | Merrey et al. | 381/386 |

FOREIGN PATENT DOCUMENTS

TW    M344013 U    11/2008

* cited by examiner

*Primary Examiner* — Gwendolyn Baxter
(74) *Attorney, Agent, or Firm* — Chun-Ming Shih

(57) ABSTRACT

An installer is installed in a hole in a ceiling or a wall and includes a speaker frame and two connective units. The speaker frame may fix down a speaker and has a circumferential edge. The two connective units are provided on the speaker frame and either connective unit has a connective flexible strip, which may contract or expand laterally by moving in the longitudinal direction. First, as the two connective flexible strips contract inwardly in the radial direction, the speaker may be allowed to pass and then be placed in the hole. Then, as the two connective flexible strips expand outwardly in the radial direction, the diameter formed by the two connective units is larger than that of the hole. Now, the outer layer of a wall or a ceiling is sandwiched in between the circumferential edge and the two connective flexible strips.

5 Claims, 7 Drawing Sheets

IN-CEILING, IN-WALL ONE BUTTON INSTALLER

BACKGROUND OF THE INVENTION

1. Field of the Invention

The invention generally relates to a speaker installer. More particularly, the invention relates to a speaker installer that is structurally simpler to enable speakers to be installed in or uninstalled from a ceiling or a wall easily and swiftly.

2. Description of the Prior Art

In stores, department stores, shops and factories, speakers have been an effective tool to pass messages to the people. Speakers are placed in the proper locations. When there is a need to send a message to the people, broadcast may be carried out through these speakers.

For the sake of appearance and safety, speakers are usually hidden. Speakers are usually securely installed in holes formed in a ceiling or wall. In addition, speakers are usually in flush with the outer surface of the ceiling or wall and they should be firmly installed and should not be accidentally bumped to ensure a long service life.

Also, it would be difficult for ordinary people to install speakers. In addition, this is a need to maintain, upgrade and replace them because they are not of durable goods. In the prior art, speakers are firmly fixed in a ceiling or a wall. Therefore, future maintenance of them would be difficult to carry out and higher cost and more time would be needed in the maintenance.

In Taiwan patent no. 097,206,749, a swift installation device for speakers is disclosed. In the invention, engagement design is used to enable a speaker to be installed in or uninstalled from a ceiling or a wall easily.

However, most of the installation devices of the prior art are structurally complicated and hence the maintenance of speakers is difficult to do. Therefore, they need to be improved.

From the above, we can see that the installation devices of the prior art have many disadvantages and need to be improved.

To eliminate the disadvantages in the prior art, the inventor has put a lot of effort into the subject and has successfully come up with the in-ceiling, in-wall one button installer of the present invention.

SUMMARY OF THE INVENTION

An object of the present invention is to provide an in-ceiling, in-wall one button installer that may be installed in and uninstalled from a ceiling or a wall easily, quickly and accurately to facilitate the installation, maintenance, upgrading and replacement of speakers.

Another object of the present invention is to provide an in-ceiling, in-wall one button installer that is compact, structurally simple and of lower cost.

The third object of the present invention is to provide an in-ceiling, in-wall one button installer that is easy to install and that a speaker may be held securely by the installer.

To reach these objects, the in-ceiling, in-wall one button installer of the present invention is disclosed. The in-ceiling, in-wall one button installer of the present invention comprises a speaker frame and two connective units. The speaker frame may fix down a speaker and has a circumferential edge, whose diameter is bigger than that of a hole formed in a ceiling or a wall. As the speaker frame is placed into the hole, the circumferential edge would press against the outer surface of the wall or ceiling. The two connective units are disposed on the speaker frame. Either connective unit has a connective flexible strip, which may contract or expand laterally by moving in the longitudinal direction. As the two connective flexible strips contract inwardly in the radial direction, the speaker may be allowed to pass and then be placed in the hole. As the two connective flexible strips expand outwardly in the radial direction, the diameter formed by the two connective flexible strips is larger than that of the hole and the wall of the wall or ceiling is sandwiched in between the circumferential edge and the two connective flexible strips. In such manner, the speaker installer of the present invention may be quickly installed.

These features and advantages of the present invention will be fully understood and appreciated from the following detailed description of the accompanying Drawings.

DETAILED DESCRIPTION OF THE PREFERRED EMBODIMENT

Figure 1:
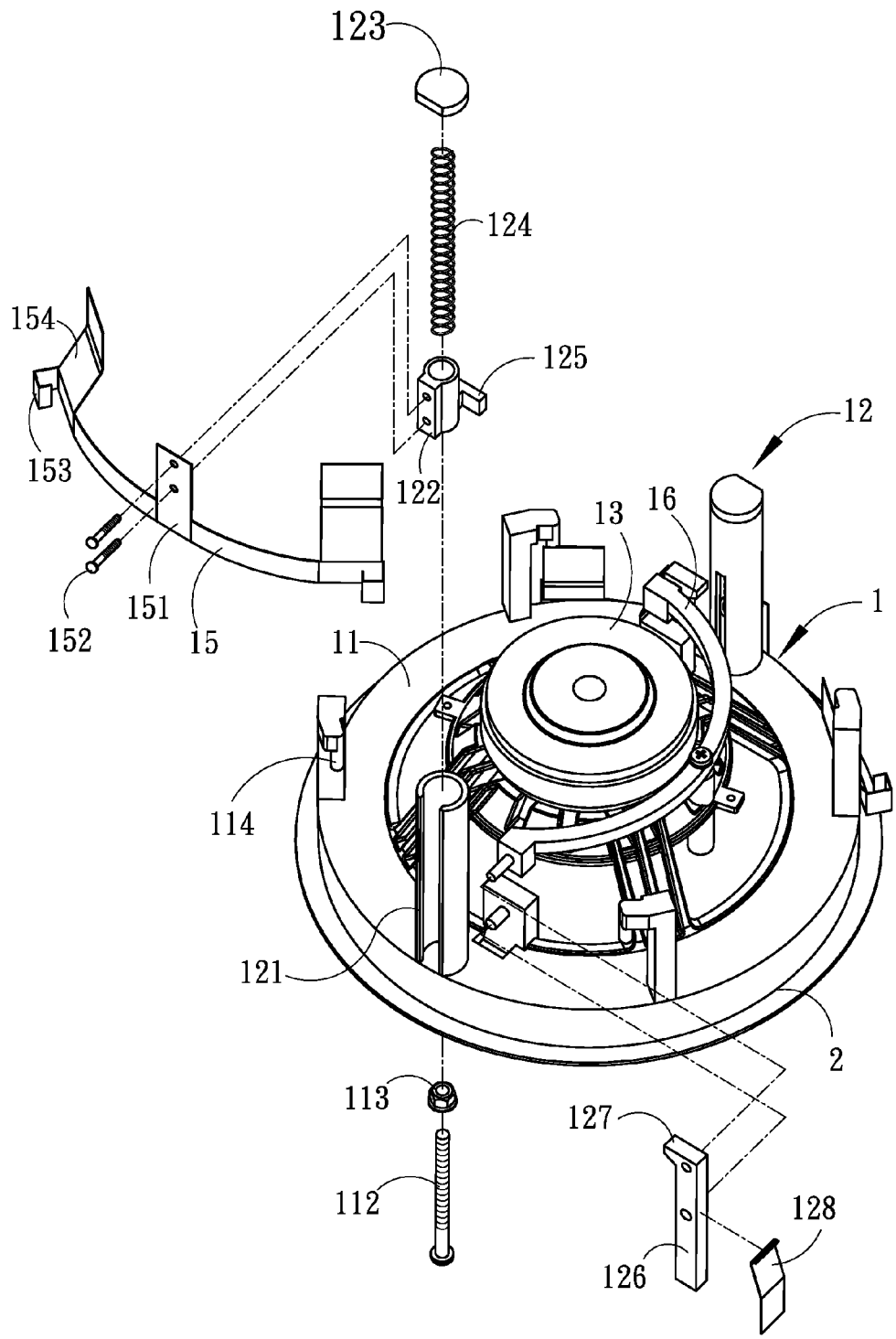
FIG. 1 is an exploded view of the in-ceiling, in-wall one button installer of the present invention.
Figure 2:
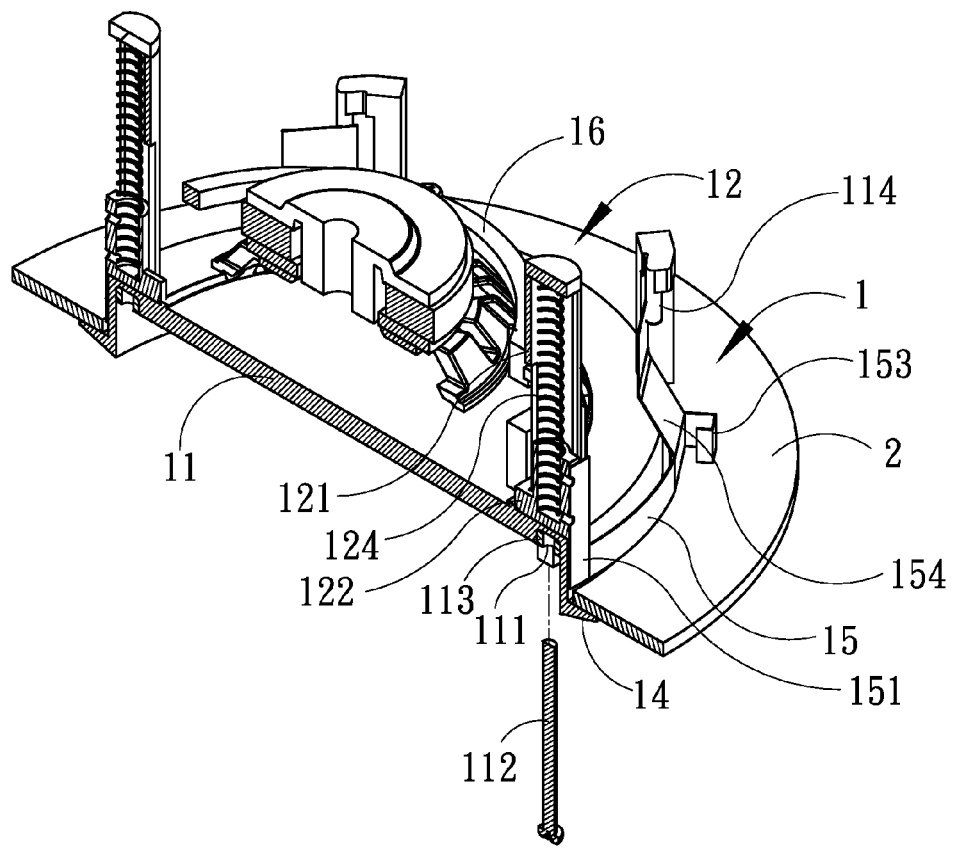
FIG. 2 is a cutaway view of the in-ceiling, in-wall one button installer of the present invention.
Figure 3:
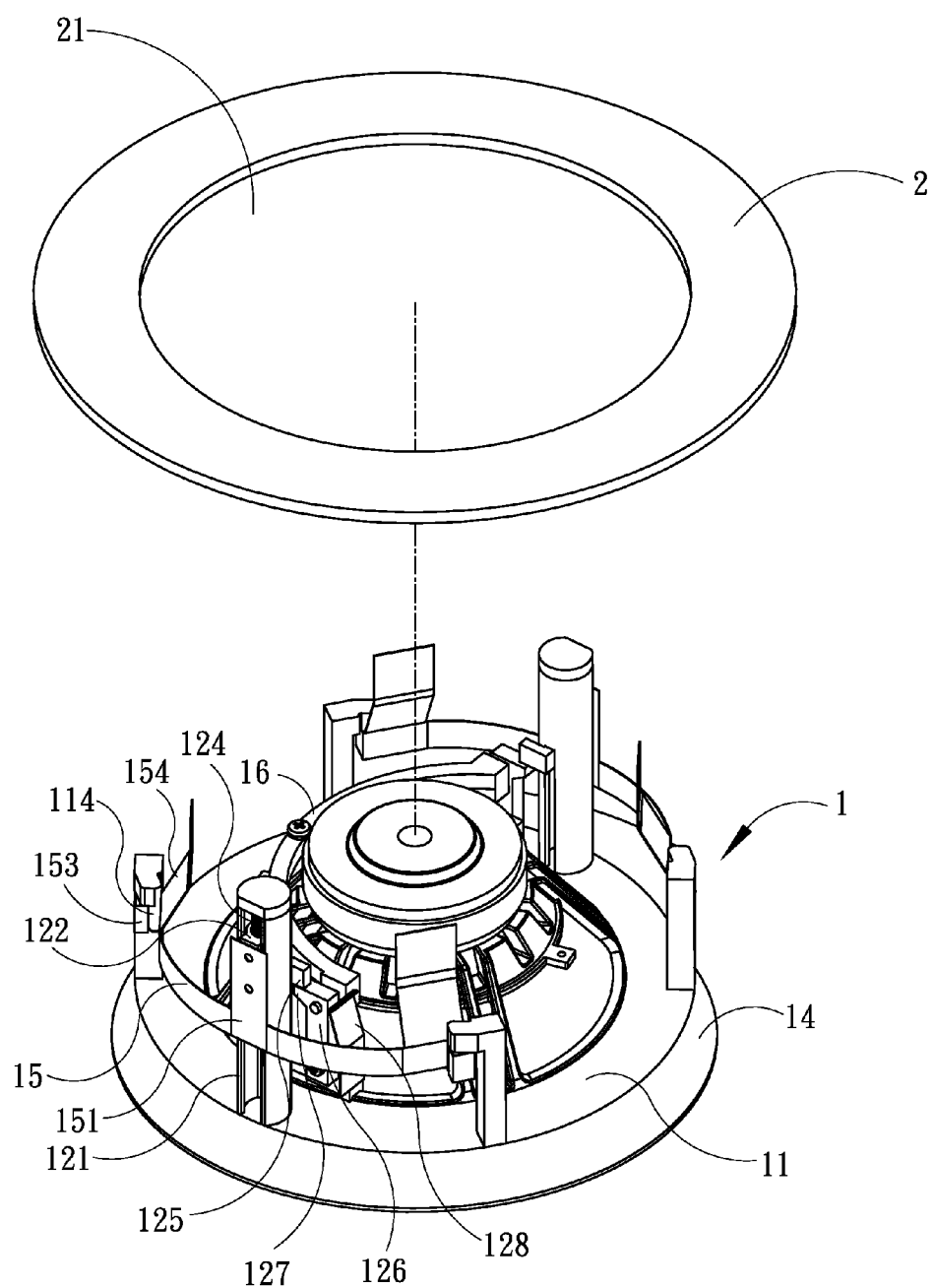
FIG. 3 is a perspective view showing the first phase in the installation of the in-ceiling, in-wall one button installer of the present invention.

Please refer to FIGS. 1 to 3, which illustrate an in-ceiling, in-wall one button installer 1 of the present invention. The speaker installer 1 may be installed in a hole 21 in a ceiling or a wall.

The speaker installer 1 of the present invention comprises a speaker frame 11 and two connective units 12. The speaker frame 11 may fix down a speaker 13 and has a circumferential edge 14, whose diameter is bigger than that of the hole 21. As the speaker frame 11 is placed into the hole 21, the circumferential edge 14 would press against the outer surface 2 of the wall or ceiling. The two connective units 12 are disposed on the speaker frame 11. Either connective unit 12 has a connective flexible strip 15, which may contract or expand laterally by moving in the longitudinal direction.

We will elaborate on the structure of either connective flexible strip 15 in the following. A fixing strip 151 is provided in the middle portion of the connective flexible strip 15. Fasteners 152 are used to fix the fixing strip 151 onto the corresponding connective piece 122. A seating portion 153 is provided on either end of the connective flexible strip 15 and may press against the outer surface 2 to secure the installer 1. A flexible piece 154 extends from the back of either seating portion 153. A guiding rod 114 that corresponds to each flexible piece 154 is provided on the speaker frame 11 so that each flexible piece 154 may press against the corresponding guiding rod 114. Either connective flexible strip 15 is positioned and held by the fixing strip 151 and the two flexible pieces 154.

First, as the two connective flexible strips 15 are pushed upwards, the two flexible pieces 154 of each connective flexible strip 15 and hence the seating portions 153 are pushed inwards by the corresponding guiding rod 114. Also, the seating portions 153 would be pushed inwards so that the diameter formed by the two connective flexible strips 15 and the seating portions 153 is smaller than that of the frame 11 and that of the hole 21, allowing the frame 11 to enter the hole 21. Then, as the two connective flexible strips 15 are pushed downwards, the two flexible pieces 154 of each connective flexible strip 15 moves outwards to prompt the seating portions 153 to move outwards so that the diameter formed by the two connective flexible strips 15 and the seating portions 153 is larger than that of the frame 11 and that of the hole 21 so that the connective flexible strips 15 may press against the outer surface 2. In addition, the outer layer 2 of a wall or ceiling is sandwiched and held by the circumferential edge 14. Therefore, the speaker installer 1 may be swiftly installed.

Please see FIGS. 1 and 2 for the structure of the two connective units 12. Either connective unit 12 has a tubular portion 121, a connective piece 122, a cover 123 and a spring 124. The connective piece 122 is provided in the tubular portion 121. The connective piece 122 is inserted from the top of the tubular portion 121. The cover 123 is placed on top of the tubular portion 121. The spring 124 is disposed between the cover 123 and the connective piece 122. The spring 124 pushes the connective piece 122 downwards so that the latter may push against the speaker frame 11. In addition, either connective flexible strip 15 is connected with the corresponding the connective piece 122. When the two connective pieces 122 are not pushed, the diameter formed by the two connective flexible strips 15 is greater than the diameter of the hole 21. In use, first, the two connective pieces 122 are pushed upwards so that the two connective flexible strips 15 move inwards. An opening 111 is provided at a location corresponding to either connective piece 122 in the speaker frame 11. A nut 113 is provided and embedded in the opening 111. Therefore, a threaded piece 112 may engage with the nut 113 and hence to move the two connective pieces 122. In use, we can push the two threaded pieces 112 upwards to move the two connective pieces 122.

As the threaded piece 112 moves upwards, the threaded piece 112 should be held in position. Therefore, a protrusion 125 is provided on either connective piece 122 and a pivotal piece 126 is provided at a location corresponding to the protrusion 125 on the speaker frame 11. Each pivotal piece 126 is pivotally provided on the speaker frame 11 and may turn pivotally. The lower portion of either pivotal piece 126 extends out of the speaker frame 11 and may facilitate the use of the installer. A hook portion 127 is formed on the upper portion of either pivotal piece 126 and a flexible piece 128 is disposed by either pivotal piece 126 to push the hook portion 127 towards the protrusion 125.

Figure 4:
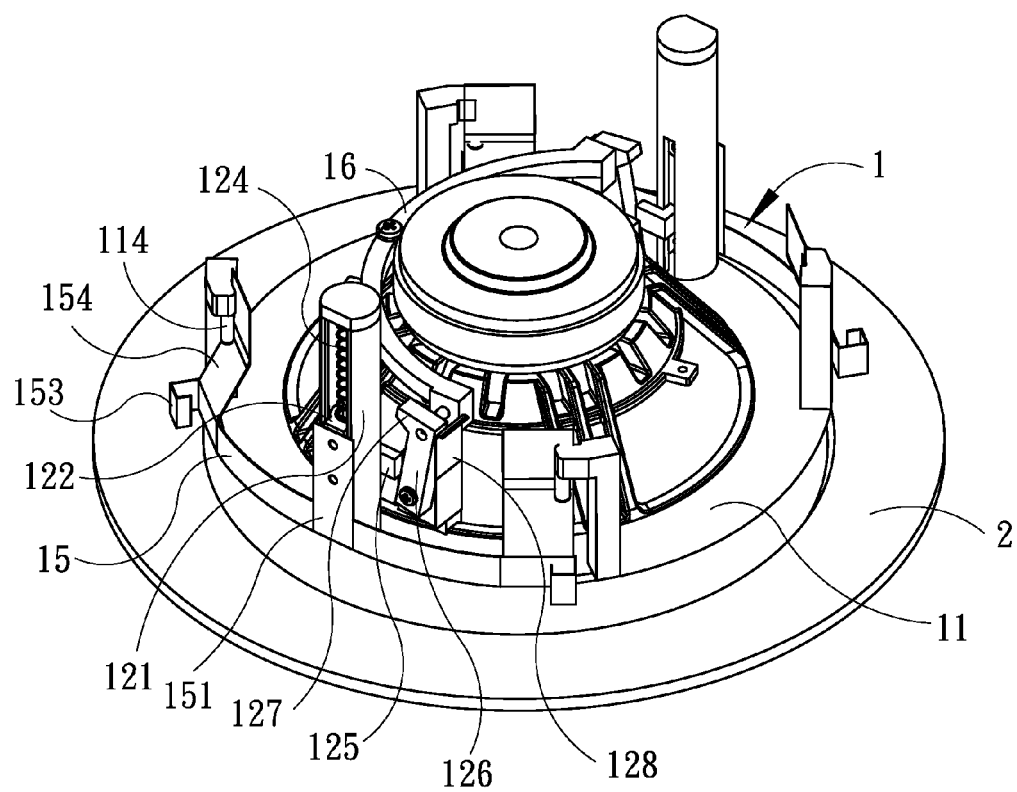
FIG. 4 is a perspective view showing the second phase in the installation of the in-ceiling, in-wall one button installer of the present invention.
Figure 5:
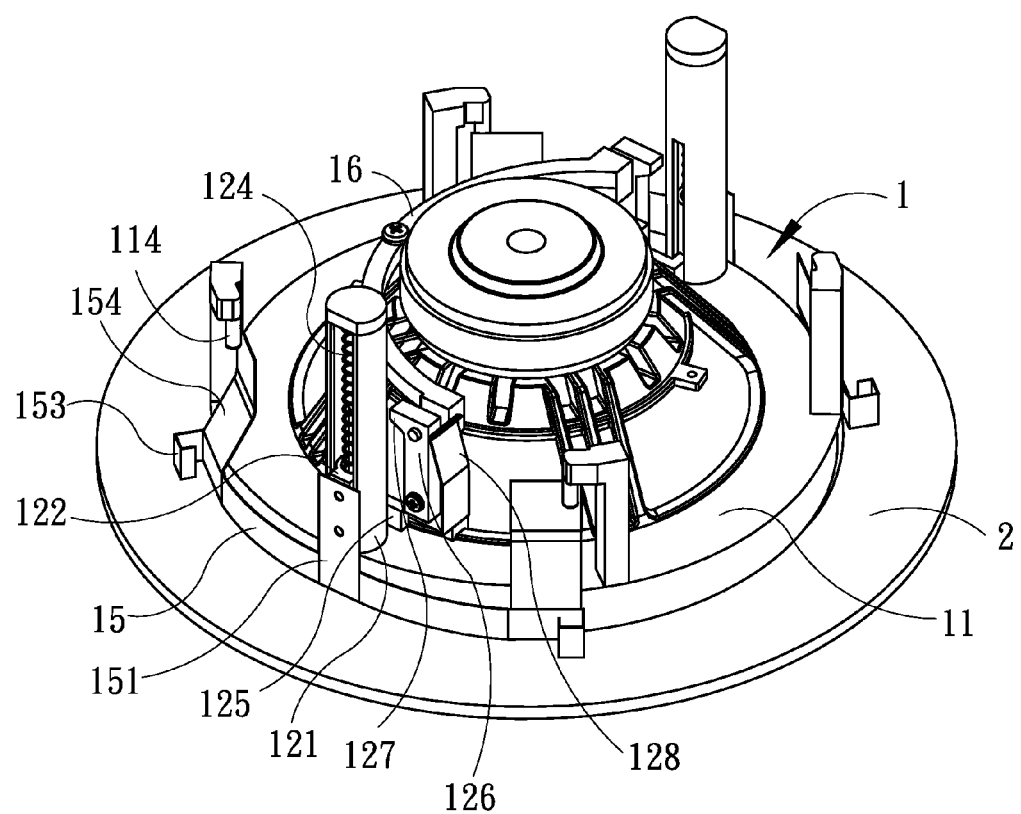
FIG. 5 is a perspective view showing the third and final phase in the installation of the in-ceiling, in-wall one button installer of the present invention.

Please refer to FIGS. 3, 4 and 5, which illustrate how the installer 1 of the present invention is installed in a wall. First, insert the threaded piece 112 through the opening 111 into the tubular portion 121 by rotating the threaded piece 112. Then, push the threaded piece 112 upwards so that the threaded piece 112 and the two connective flexible strips 15 move towards the top portion of the tubular portion 121 (as shown in FIG. 3). As they move towards the top portion of the tubular portion 121, either protrusion 125 pushes the corresponding pivotal piece 126 outwards so that either connective piece 122 is not limited by the hook portion 127 and may reach the top portion of the tubular portion 121. Now, the two connective flexible strips 15 move inwards so that their diameter is smaller than the hole 21 (as shown in FIG. 4). Next, the flexible piece 128 acts on the pivotal piece 126 so that the latter returns to its former position. In the mean time, the position of either protrusion 125 is limited by the corresponding hook portion 127 so that the hook portion 127 limits the position of either protrusion 125 to prevent the downward movement of either connective piece 122 and either connective flexible strip 15. Now, the installer 1 and the speaker may be installed (as shown in FIG. 5).

Now, please refer to FIG. 1. As the installer 1 is placed into the hole 21, we may move the pivotal pieces 126 to prompt either hook portion 127 to move away from the corresponding protrusion 125 and then either connective piece 122 is acted upon by the spring 124 to return to its former position so that the outer layer 2 of a wall or ceiling is sandwiched between the two connective flexible strips 15 and the circumferential edge 14.

When we need to uninstall the installer, first we move the two connective pieces 122 towards the top portion of the tubular portion 121. Then, we may detach the installer 1 from the hole 21.

In addition, a connective member 16, which connects the two pivotal pieces 126, is provided. Therefore, in use, we only have to push a single member, the connective member 16, instead of two members, the two threaded pieces 112, to move the two connective pieces 122.

Figure 6:
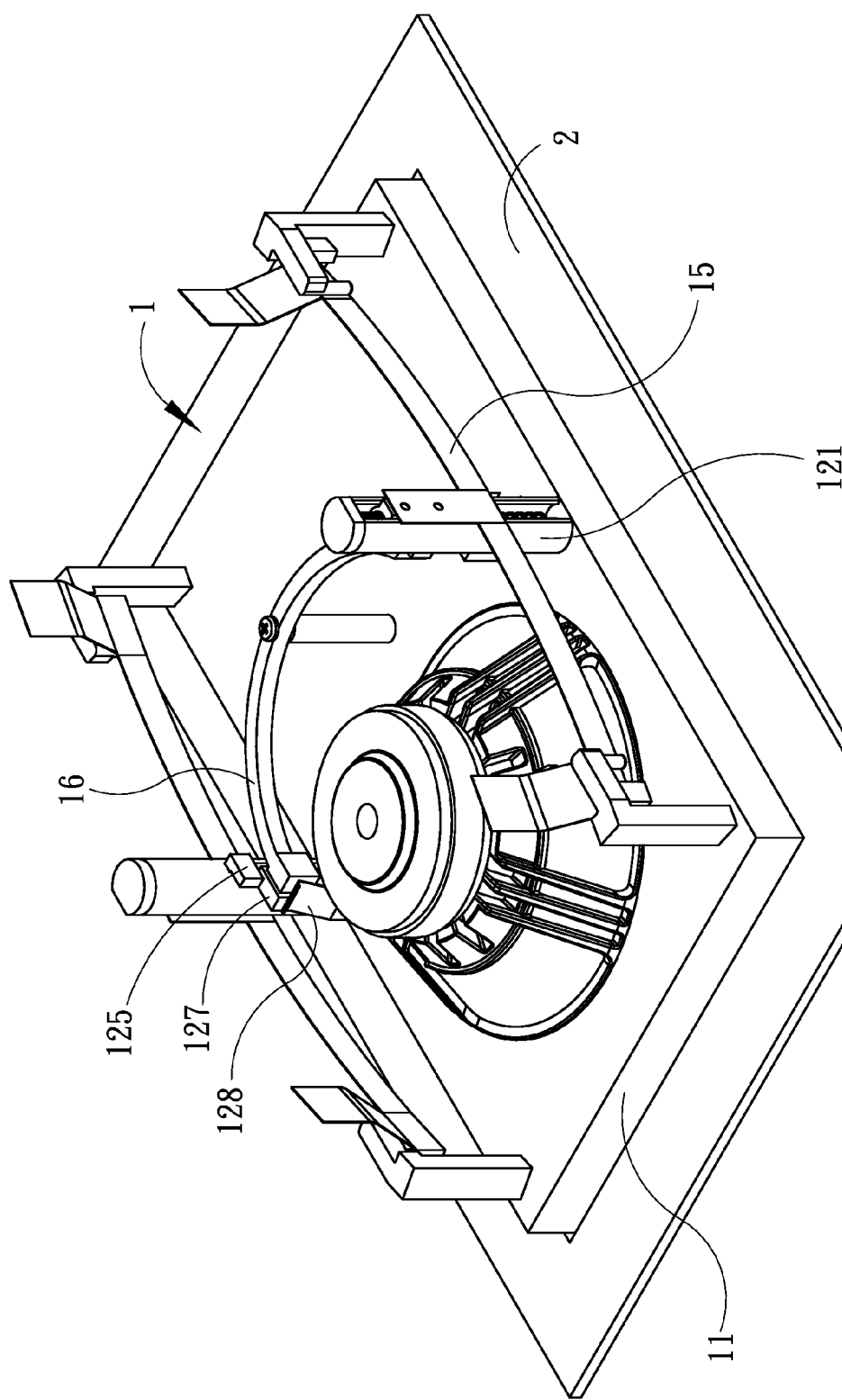
FIG. 6 is a perspective view showing another embodiment that has a slightly different appearance in an installed condition.

Please see FIG. 6, which illustrates another embodiment that has a slightly different appearance. However, it still has the same structure and still has the two connective units 12 to achieve the goals of fast installation and uninstallation.

Figure 7:
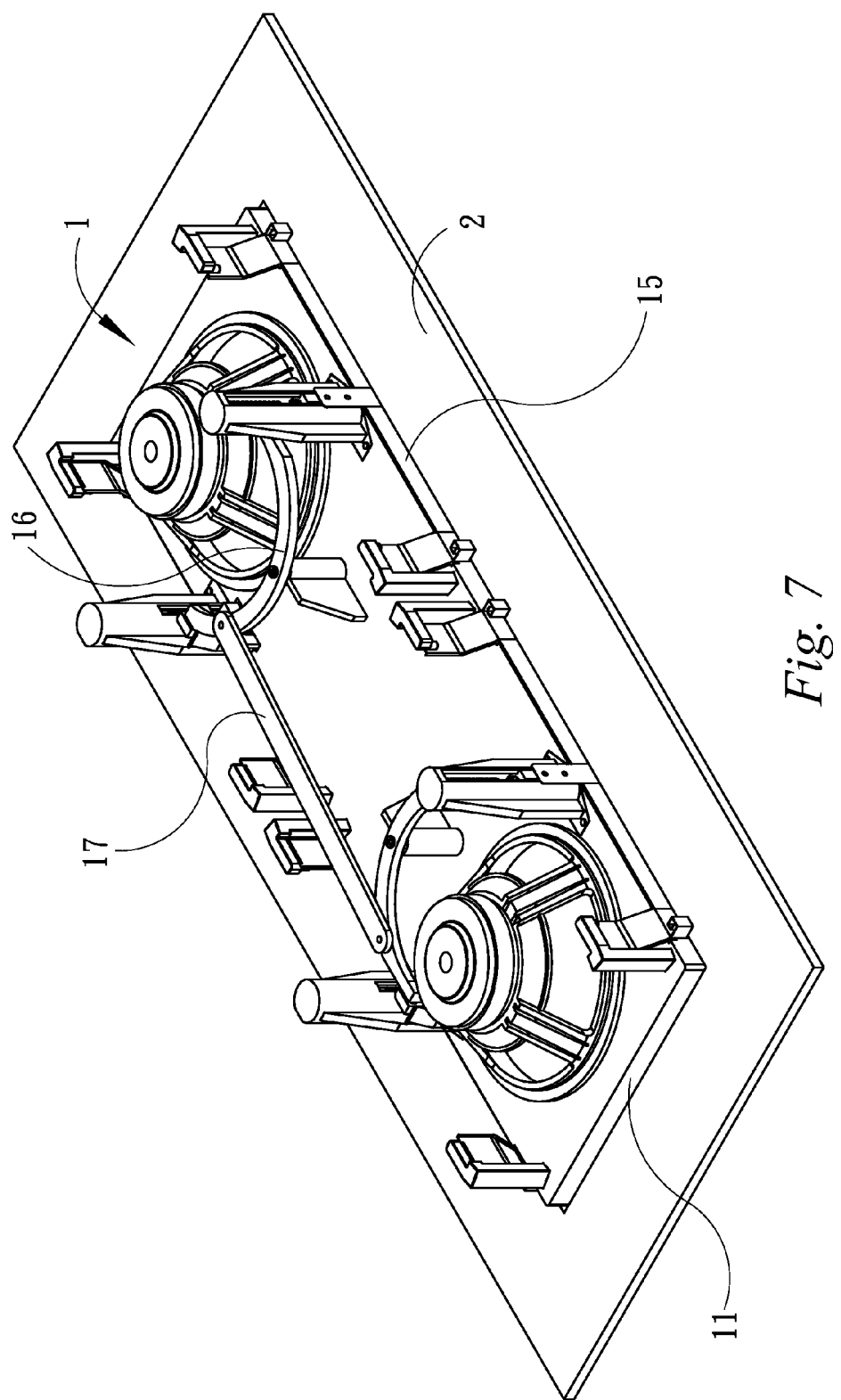
FIG. 7 is a perspective view showing that a plurality of installers may be used together.

Now, please see FIG. 7, which illustrates that a plurality of installers may be used together. The speaker frames 11 of these installers are joined together. Optionally, a connective rod 17 linking the two or more connective members may be provided. Therefore, we only have to press a single member, the connective rod 17, in use.

Although a preferred embodiment of the present invention has been described in detail hereinabove, it should be understood that the preferred embodiment is to be regarded in an illustrative manner rather than a restrictive manner, and all variations and modifications of the basic inventive concepts herein taught still fall within the scope of the present invention.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An in-ceiling, in-wall one button installer which is placed in a hole formed in a ceiling or a wall, comprising:
   a speaker frame, which fixes down a speaker and has a circumferential edge, whose diameter is bigger than that of the hole; and
   two connective units, which are provided on the speaker frame, wherein each connective unit has a connective flexible strip, which contracts or expands laterally by moving, and characterized in that, first, as two connective flexible strips contract inwardly in a radial direction, the speaker is allowed to pass and then be placed in the hole, and characterized in that, then, as the two connective flexible strips expand outwardly in the radial direction, the diameter formed by the two connective units is larger than that of the hole and the outer layer of a wall or a ceiling is sandwiched in between the circumferential edge and the two connective flexible strips, wherein each connective unit has a tubular portion and a connective piece is provided in the tubular portion, and wherein a cover is placed on top of the tubular portion and a spring is disposed between the cover and the connective piece, and wherein the spring pushes the connective piece downwards so that the latter pushes against the speaker frame, and wherein an opening is provided at a location corresponding to each connective piece in the speaker frame and a nut is provided and embedded in the opening so that a threaded piece engages with the nut and hence to move the two connective pieces.

2. The in-ceiling, in-wall one button installer as in claim 1, wherein a protrusion is provided on each connective piece and a pivotal piece is provided at a location corresponding to the protrusion on the speaker frame, and wherein each pivotal piece is pivotally provided on the speaker frame and turns pivotally, and wherein the lower portion of the pivotal piece extends out of the speaker frame and facilitates the use of the installer, and wherein a hook portion is formed on the upper portion of the pivotal piece and a flexible piece is disposed by the pivotal piece to push the hook portion towards the protrusion, and characterized in that, the flexible piece acts on the pivotal piece so that the latter returns to its former position; in the mean time, the position of the protrusion is limited and fixed by the corresponding hook portion so that the hook portion limits the position of the protrusion to prevent the downward movement of the connective piece and the connective flexible strip.

3. The in-ceiling, in-wall one button installer as in claim 2, wherein a connective member, which connects the two pivotal pieces, is provided so that, in use, only have to push a single member, the connective member, instead of two members, the two threaded pieces, to move the two connective pieces.

4. The in-ceiling, in-wall one button installer as in claim 1, wherein a fixing strip is provided at the middle portion of the connective flexible strip and fasteners are used to fix the fixing strip onto the corresponding connective piece, and wherein a seating portion is provided on either end of the connective flexible strip and presses against the outer surface to secure the installer and a flexible piece extends from the back of the seating portion, and wherein a guiding rod that corresponds to each flexible piece is provided on the speaker frame so that each flexible piece presses against the corresponding guiding rod.

5. The in-ceiling, in-wall one button installer as in claim 1, wherein a plurality of installers are used together and the speaker frames of these installers are joined together, and wherein, optionally, a connective rod linking these connective members is provided.

* * * * *